United States Patent
Schiffert

(10) Patent No.: US 11,725,795 B2
(45) Date of Patent: Aug. 15, 2023

(54) LIGHT FOR THE EXTERIOR OF A VEHICLE

(71) Applicant: DAIMLER AG, Stuttgart (DE)

(72) Inventor: Hans Peter Schiffert, Wiesenttal (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/437,899

(22) PCT Filed: Feb. 5, 2020

(86) PCT No.: PCT/EP2020/052856
§ 371 (c)(1),
(2) Date: Sep. 10, 2021

(87) PCT Pub. No.: WO2020/182377
PCT Pub. Date: Sep. 17, 2020

(65) Prior Publication Data
US 2022/0146072 A1   May 12, 2022

(30) Foreign Application Priority Data
Mar. 12, 2019   (DE) ...................... 10 2019 001 757.9

(51) Int. Cl.
*F21S 43/20*        (2018.01)
*F21S 43/14*        (2018.01)
(Continued)

(52) U.S. Cl.
CPC .............. *F21S 43/255* (2018.01); *F21S 43/14* (2018.01); *F21S 43/26* (2018.01); *F21W 2103/10* (2018.01); *F21W 2103/45* (2018.01)

(58) Field of Classification Search
CPC .......... F21S 43/14; F21S 43/255; F21S 43/26; F21W 2103/10; F21W 2103/40–45
See application file for complete search history.

(56) References Cited

U.S. PATENT DOCUMENTS 9,791,124 B2 * 10/2017 Vincens ................... B60Q 1/34
2003/0035296 A1   2/2003 Natsume et al.
(Continued)

FOREIGN PATENT DOCUMENTS

DE        3930214 A1    3/1991
DE    102007022378 A1   11/2008
(Continued)

OTHER PUBLICATIONS

International Search Report dated May 6, 2020 in related/corresponding International Application No. PCT/EP2020/052856.
(Continued)

*Primary Examiner* — Jason M Han
(74) *Attorney, Agent, or Firm* — Patent Portfolio Builders PLLC

(57) ABSTRACT

A light for the exterior of a vehicle includes at least one illuminant and a lens. The illuminant emits light in an activated state that hits the lens directly or indirectly via a reflector. The lens is transparent to light in a first predetermined wavelength range and reflects light in a second different wavelength range when the illuminant is deactivated. The illuminant is at least one light-emitting diode (LED). The diode emits light in a third wavelength range, which is predetermined such that the emitted light, after transmission through the lens, is present in a predetermined fourth wavelength range that is at least different from the second wavelength region. The light can be used as part of a rear light in a vehicle.

10 Claims, 1 Drawing Sheet

Figure 1:
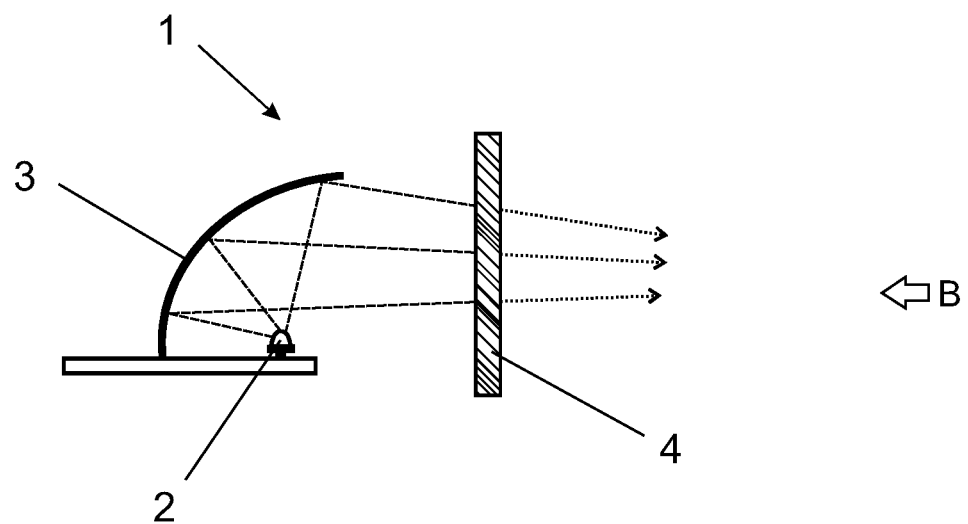

(51) Int. Cl.
*F21W 103/10* (2018.01)
*F21W 103/45* (2018.01)

(56) References Cited

U.S. PATENT DOCUMENTS

| | | |
|---|---|---|
| 2013/0148371 A1 | 6/2013 | Kim |
| 2014/0369060 A1* | 12/2014 | Zhang .................... F21S 43/26 29/592.1 |

FOREIGN PATENT DOCUMENTS

| | | |
|---|---|---|
| DE | 102014009612 A1 | 11/2014 |
| DE | 202017105788 U1 | 10/2017 |
| DE | 202017106313 U1 | 11/2017 |
| EP | 1104870 A2 | 6/2001 |
| EP | 2955063 A1 | 12/2015 |
| FR | 2886375 A1 | 12/2006 |

OTHER PUBLICATIONS

Written Opinion dated May 6, 2020 in related/corresponding International Application No. PCT/EP2020/052856.
English translation of Office Action dated Nov. 3, 2022 in related/corresponding CN Application No. 2020800184812.
Office Action dated May 15, 2023 in related/corresponding CN Application No. 20208001848.2.

* cited by examiner

LIGHT FOR THE EXTERIOR OF A VEHICLE

BACKGROUND AND SUMMARY

Exemplary embodiments of the invention relate to a light for the exterior of a vehicle, as well the use of such a light.

DE 10 2014 009 612 A1 of the applicant forms the generic prior art. This relates to a light, in particular for the exterior of a vehicle, consisting of an illuminant, preferably a light-emitting diode, a reflector and a light disk, wherein the illuminant can be activated and deactivated. By means of the light disk, the light has a different coloring for a viewer in the deactivated state of the illuminant than in the activated state. For this purpose, the illuminant in the activated state emits light that hits the reflector, which absorbs light in a certain wavelength range and reflects light in another wavelength range. The light reflected by the reflector then hits the light disk, which is only transparent to light in a certain wavelength range. This shifts the color location of the light from the illuminant when it is transmitted through the light disk. If this is deactivated, a color impression different from that of transmitted light is produced by reflection of incident light from the surroundings onto the light disk of the light.

Exemplary embodiments are directed to further improving a light for a vehicle.

The light according to the invention for the exterior of a vehicle comprises, comparable to the light in the generic prior art, an illuminant and a light disk, wherein the illuminant emits light in an activated state and not in a deactivated state. The light is then directed directly, or indirectly via a reflector, onto the light disk and is emitted through it into the environment. The light disk itself is, comparable to the light disk in the generic prior art, only transparent for a first predetermined wavelength range. It therefore only allows light in the desired light color to pass through or shifts the wavelength range of the light hitting it such that it emits light in the desired light color. This corresponds as far as possible to the structure from the prior art, in which, as an example, cyan-colored light hits the light disk and is emitted from it in the form of white light. When the illuminant is deactivated, the light disk reflects light from the external environment in a second different wavelength range. This can, for example, be red, as outlined in the exemplary embodiment of the prior art. Thus, when the illuminant is switched on, white light would be transmitted through the light disk; when the illuminant is switched off, the light disk appears red and is suitable, for example, as the outer cover light disk of a rear light of a vehicle.

The illuminant is now designed in the form of at least one light-emitting diode. The special feature compared to the generic prior art is that this light-emitting diode emits light in a third wavelength range, which is predetermined such that the emitted light, after transmission through the light disk, lies in a predetermined fourth wavelength range, which is at least different from the second wavelength range. By way of example, as in the exemplary embodiment of the generic prior art, red light in the second wavelength range can be reflected by the light disk. The LED emits cyan light, and the light transmitted through the light disk, when emitted from the light disk, is in the white color range of the CIE color diagram.

The light according to the invention thus achieves comparable behavior to the light in the generic prior art. However, this is achieved by means of a much simpler design, which requires fewer components, such that a smaller required installation space for the optical system is possible. At the same time, a very homogenous color distribution or light distribution can be achieved over the entire beam angle of the light-emitting diode, since adsorption of certain wavelengths in the area of the reflector, if such a reflector is present at all, can be dispensed with, which improves the homogeneity of both the color distribution and the light distribution. The optical system also has significantly lower tolerances to meet the legal white requirements within the CIE color space, since the reflective color filter can be dispensed with.

The cyan-colored light is thus emitted directly from the illuminant, one or more LEDS of suitable design, in the color-appropriate exemplary embodiment of the generic prior art, and does not need to be filtered by a separate component, which is the one wavelength range adsorbing reflector there.

Notwithstanding this, it is of course possible and, according to an advantageous design of the idea, also provided that the diode has an integrated filter element for generating the light in the third wavelength range. Unlike the filter element in the prior art, however, this is not part of the actual optical system of the light, but part of the diode itself, such that this can be implemented correspondingly simply and efficiently, in particular directly during the manufacture of the light emitting diode. Such a filter can be sprayed on or implemented by volume casting, for example, such that the light-emitting diode as an overall component itself already emits the light at the desired wavelength.

As already mentioned, according to an advantageous development, the diode can emit light in the wavelength range of the cyan-colored light according to the CIE color diagram. The light disk can reflect light in the wavelength range of the red light according to the CIE color diagram. Furthermore, the light disk can transmit the cyan-colored light of the illuminant in this embodiment of the invention as white light according to the CIE color diagram.

The light, in which the light disk forms the outer cover light disk according to an advantageous development of the idea, in order to implement the structure even more simply and compactly, can preferably be used as part of a rear light in a vehicle. This part of the rear light in a vehicle can, according to a very advantageous development of this use, fulfil the function of a reverse light, similar to the structure in the generic prior art.

Further advantageous designs of the light according to the invention as well as its use also emerge from the exemplary embodiment, which is depicted in more detail below with reference to the figures.

BRIEF DESCRIPTION OF THE DRAWING FIGURES

Figure 2:
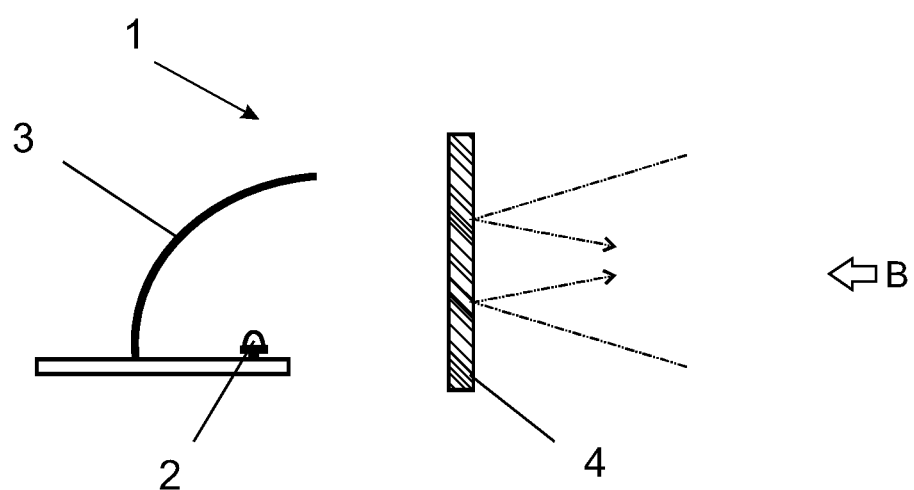

Here are shown:

FIG. 1 a schematic cross-section through a light in an embodiment according to the invention in a first operating state; and FIG. 2 the light according to FIG. 1 in a second operating state.

DETAILED DESCRIPTION

FIG. 1 shows a light 1, which is particularly suitable for use as a rear light or as part of a rear light for the exterior of a vehicle. The light 1, which is depicted here without its housing, comprises at least one illuminant 2 in the form of a light-emitting diode. This light-emitting diode 2 as an illuminant 2 can be of any design, for example as a conventional LED, OLED, or QLED. The light-emitting diode 2 can thereby be implemented in the form of a single light-emitting diode or in the form of an array with a plurality of light-emitting diodes. In the exemplary embodiment depicted here, the light of the illuminant 2 reaches a reflector 3 and is emitted by the latter through a light disk 4 in the direction of a viewer B, whose viewing direction is indicated by an arrow. The light disk 4 can in particular be the cover light disk of the light 1, such that the overall design can be implemented with very few components and is very compact.

In the depiction of FIG. 1, the activated state of the illuminant 2 is depicted, i.e., the switched-on LED 2. With the switched-off LED 2, the light 1 is depicted in the otherwise comparable FIG. 2. For the viewer B, the structure depicted in FIG. 2 appears visually as indicated by the light reflected from the light disk 4, indicated here by dash-dotted lines. In the depicted exemplary embodiment, this reflected light is to be reflected, for example, with a wavelength lying in the red color range of the CIE color diagram. The light disk 4 of the light 1 thus appears red in the deactivated state of the LED 2.

In the depiction of FIG. 1, the LED 2 is activated and emits light. This light is emitted in a first wavelength range which, according to the exemplary embodiment depicted here, should lie in the cyan-colored range of the CIE color diagram. This is achieved either by the LED 2 as the illuminant 2 being constructed in such a way that it directly generates and emits light in the cyan-colored wavelength range, or by the light of the LED being adapted accordingly via integrated filter elements such that the emitted light, depicted here in dashed lines, is cyan-colored. This light is now directed, in the exemplary embodiment of the figures, via the reflector 3 in the direction of the light disk 4. It would be just as conceivable to arrange the LED 2 in such a way that it emits light directly in the direction of the light disk 4 and thus towards the viewer B, such that the optional reflector 3 could be dispensed with.

Regardless of whether this reflector 3 is used or not, it is the case that now, in the exemplary embodiment depicted here, the cyan-colored light, which in particular only has wavelengths of less than 600 nm, arrives at the light disk 4. Due to the structure of the light disk 4, this light is now "colored" in such a way that the viewer B sees a white light, since the light disk 4 shifts the cyan light, which is shown here in dashed lines, with respect to its color location in the CIE color diagram, such that the white light, which is shown here with dotted lines, reaches the viewer B after transmission through the light disk 4.

This light, which is depicted by dotted lines and lies in the white range of the CIE color diagram, is permissible for the function of a reverse light in accordance with the ECE standard, such that the described structure can be used in particular to implement the reverse light as part of a rear light of a vehicle. In this way, it is possible to emit white light into the surroundings despite a light disk 4 that is colored continuously, for example red, and thus to implement the functionality of the reverse light.

However, other wavelength ranges which lead to other light colors in the individual steps of light emission with the light 1 described here are also conceivable, and comprised by the disclosure content and the scope of protection of the claims.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A light for the exterior of a vehicle, the light comprising:
    at least one illuminant; and
    a light disk,
    wherein, in an activated state of the illuminant, the illuminant emits light that hits the light disk directly,
    wherein the light disk is transparent to light in a first predetermined wavelength range and reflects light in a second wavelength range when the illuminant is deactivated, wherein the first predetermined wavelength range is different than the second wavelength range,
    wherein the illuminant is at least one light-emitting diode (LED), which emits light in a third wavelength range that is predetermined such that the emitted light, after transmission through the light disk, is present in a predetermined fourth wavelength range that is at least different from the second wavelength range, and
    wherein the at least one LED emits light in a wavelength range of a cyan-colored light according to a CIE color diagram.

2. The light of claim 1, wherein the LED has an integrated filter element that is part of the at least one LED itself, and is sprayed on or volume casted on the LED so that the LED emits light in the wavelength range of the cyan-colored light according to a CIE color diagram.

3. The light of claim 2, wherein the light disk is an outer cover light disk of the light.

4. The light of claim 2, wherein the second wavelength range is in a wavelength range of red light according to the CIE color diagram.

5. The light of claim 4, wherein the light disk transmits the cyan-colored light of the illuminant as white light according to the CIE color diagram.

6. The light of claim 2, wherein the light is a rear light of the vehicle.

7. The light of claim 6, wherein the rear light is a reverse light of the vehicle.

8. A light for the exterior of a vehicle, the light comprising:
    at least one illuminant; and
    a light disk,
    wherein, in an activated state of the illuminant, the illuminant emits light that hits the light disk directly or indirectly via a reflector,
    wherein the light disk is transparent to light in a first predetermined wavelength range and reflects light in a second wavelength range when the illuminant is deactivated, wherein the first predetermined wavelength range is different than the second wavelength range,
    wherein the illuminant is at least one light-emitting diode (LED), which emits light in a third wavelength range that is predetermined such that the emitted light, after transmission through the light disk, is present in a predetermined fourth wavelength range that is at least different from the second wavelength range, wherein the at least one LED has an integrated filter element that generates the light in the third wavelength range, wherein the integrated filter element is part of the at least one LED itself and is sprayed on or volume casted on the at least one LED so that the at least one LED emits light in the third wavelength range, which is a wavelength range of a cyan-colored light according to a CIE color diagram.

9. The light of claim 8, wherein the reflector does not have a color filter.

10. A light for the exterior of a vehicle, the light comprising:

a light disk;

a reflector; and at least one light-emitting diode (LED), which comprises an integrated filter element sprayed on or volume casted on the LED so that, in an activated state of the LED, the LED emits light in a wavelength range of a cyan-colored light according to a CIE color diagram and the emitted light hits the light disk via the reflector, wherein the light disk is transparent to light in the wavelength range of the cyan-colored light and reflects light in a different wavelength range when the illuminant is deactivated, wherein the reflector does not have a color filter so that the emitted light in the wavelength range of the cyan-colored light that hits the light disk via the reflector is reflected as the light in the wavelength range of the cyan-colored light so that the light in the wavelength range of the cyan-colored light hits the light disk.

\* \* \* \* \*